(12) United States Patent
Zwickel

(10) Patent No.: US 9,506,377 B2
(45) Date of Patent: Nov. 29, 2016

(54) METHOD AND CONFIGURATION FOR THE RECOVERY OF THERMAL ENERGY IN THE HEAT TREATMENT OF COLD-ROLLED STEEL STRIP IN A HOOD-TYPE ANNEALING FURNACE

(71) Applicant: BILSTEIN GMBH & CO. KG, Hagen (DE)

(72) Inventor: Gerald Zwickel, Biedenkopf (DE)

(73) Assignee: BILSTEIN GMBH & CO. KG, Hagen (DE)

(*) Notice: Subject to any disclaimer, the term of this patent is extended or adjusted under 35 U.S.C. 154(b) by 737 days.

(21) Appl. No.: 13/904,091

(22) Filed: May 29, 2013

(65) Prior Publication Data
US 2013/0318970 A1 Dec. 5, 2013

(30) Foreign Application Priority Data
May 29, 2012 (DE) .................. 10 2012 010 382

(51) Int. Cl.
| | |
|---|---|
| F01K 13/00 | (2006.01) |
| C21D 9/673 | (2006.01) |
| F01K 25/08 | (2006.01) |
| F27B 11/00 | (2006.01) |
| F27D 17/00 | (2006.01) |
| F01K 9/00 | (2006.01) |
| F22B 1/18 | (2006.01) |

(52) U.S. Cl.
CPC ............... *F01K 13/00* (2013.01); *C21D 9/673* (2013.01); *F01K 9/003* (2013.01); *F01K 25/08* (2013.01); *F22B 1/183* (2013.01); *F27B 11/00* (2013.01); *F27D 17/004* (2013.01); *Y02E 20/14* (2013.01)

(58) Field of Classification Search
CPC ............ C21D 1/84; C21D 9/46; C21D 9/56; C21D 9/67; C21D 9/677; C21D 9/673; F01K 9/00; F01K 13/00; F01K 25/00; F01K 25/08; F01K 9/003; F22B 1/18; F22B 1/183; F27B 11/00; F27B 17/004; F27D 7/02; F27D 9/00; F27D 17/00; F27D 17/004; Y02E 20/14
USPC .......................................... 60/651; 266/252
See application file for complete search history.

(56) References Cited

U.S. PATENT DOCUMENTS

2011/0186282 A1* 8/2011 Borrel ................... C21D 9/573
165/185

FOREIGN PATENT DOCUMENTS

DE          1 186 888 B      2/1965

* cited by examiner

*Primary Examiner* — Hoang Nguyen
(74) *Attorney, Agent, or Firm* — Laurence A. Greenberg; Werner H. Stemer; Ralph E. Locher

(57) ABSTRACT

A method and a configuration recover thermal energy in a thermal treatment of cold-rolled steel strip in an annealing furnace. The steel strip is heated up in a protective gas atmosphere to a temperature above the recrystallization temperature, and is subjected in a first, slow cooling phase and a second, fast cooling phase to a protective gas. The temperature of the protective gas is reduced during the first phase down to an intermediate temperature and in the second phase from the intermediate temperature to a final temperature. A first heat exchanger transfers the thermal energy of the protective gas by an oil circuit and a second heat exchanger to a working medium, and which evaporates and is fed to a steam motor, which converts the thermal energy contained in the working medium into energy.

10 Claims, 4 Drawing Sheets

METHOD AND CONFIGURATION FOR THE RECOVERY OF THERMAL ENERGY IN THE HEAT TREATMENT OF COLD-ROLLED STEEL STRIP IN A HOOD-TYPE ANNEALING FURNACE

CROSS-REFERENCE TO RELATED APPLICATION

This application claims the priority, under 35 U.S.C. §119, of German application DE 10 2012 010 382.4, filed May 29, 2012; the prior application is herewith incorporated by reference in its entirety.

BACKGROUND OF THE INVENTION

Field of the Invention

The invention relates to a method and a configuration for the recovery of thermal energy in the heat treatment of a cold-rolled steel strip in a hood-type annealing furnace.

In the production of cold-rolled steel strips, which is also referred to by those skilled in the art as "cold strip", a hot strip previously created by rolling above the recrystallization temperature of steel is rolled down to a thickness of less than 3.0 mm by one or more further cold-rolling operations at temperatures below the recrystallization temperature, whereby a sheet having a thickness range from 3 mm to 0.5 mm or even less can be created. On account of the stretching of the microstructure of the metal that takes place in the direction of deformation during the cold-rolling operation, the strength of the material thereby increases, whereas at the same time its deformability decreases as a result of the cold hardening that occurs. Due to the cold hardening, the cold strip is too brittle for direct further processing and for this reason is often annealed in a recrystallizing manner following the cold-rolling process, in order in this way to restore the formability of the material. Recrystallization annealing is a heat treatment of the cold strip which includes heating up the material to a defined temperature above the recrystallization temperature of approximately 750 degrees Celsius, maintaining the temperature level for a predetermined time period of several hours and subsequently cooling the material down in a defined way in accordance with a predetermined temperature profile.

The process that is preferably used for this in practice is that known as batch annealing, in which the cold strip is rolled up into a coil, and a number of these coils are annealed one above the other under a closed heating hood, heated in particular by gas burners, at temperatures between 500 degrees and 800 degrees Celsius in a protective gas atmosphere of $H_2$ or NHx, in order not to destroy the laboriously produced bright and smooth surface of the cold strip. After the predetermined annealing time has elapsed, the annealing hood is changed for a cooling hood, in order thereafter to cool the coils down in a controlled manner in a protective gas atmosphere. As is known, the cooling down of the coils takes place here in two different phases, of which the first cooling phase is referred to as slow cooling, in which the temperature of the protective gas is reduced over a time period of for example 7 hours from 700 degrees Celsius down to about 400° C. This first, slow cooling phase is followed by a second cooling phase, referred to as fast cooling, in which the temperature of the protective gas is lowered over a time period of for example 7 hours from 400° C. to about 60 to 80° C.

A previously described hood-type annealing furnace is known for example from published, non-prosecuted German patent application DE 1 186 888 A1, the protective gas being passed from the hermetically closed-off interior space of the annealing hood over a heat exchanger for the recovery of part of the thermal energy that is contained in the gas, the cool protective gas that is supplied likewise being passed through the same heat exchanger for preheating the same before it is introduced into the hermetically sealed-off interior space underneath the protective hood. In this way, part of the thermal energy of the heated protective gas is used for preheating during the heating phases and while the temperature is being maintained over a predetermined time period. However, the document does not provide any suggestion of also using the thermal energy that is stored in the coil during the cooling-down phases.

In the case of the known hood-type annealing furnaces, such as those that have for example been operated in relatively great number in the past by the applicant, it is generally customary in this connection to use the heat from the coils during the cooling-down phases only for heating the rooms in which the hood-type annealing furnaces are located, and removing the heat from the heat exchangers unused by way of cooling water or else air cooling, since the logistical effort that is for example involved in directly introducing the protective gas from one hood-type annealing furnace during the cooling-down phases into another hood-type annealing furnace during the heating-up phase is very great and, in view of the amount of thermal energy that can be recovered thereby and the exponential increase in the time period with small temperature differences, is not economically worthwhile.

SUMMARY OF THE INVENTION

It is accordingly an object of the present invention to provide a method and a configuration for the recovery of thermal energy in the hood-type annealing of a cold-rolled steel strip in a hood-type annealing furnace having increased thermal efficiency in comparison with the known methods.

According to the invention, in a method for the recovery of thermal energy in the heat treatment of cold-rolled steel strip in a hood-type annealing furnace, the steel strip is heated up in a protective gas atmosphere, in particular in a hydrogen atmosphere, to a temperature above the recrystallization temperature, which depends on the type of cold strip being treated and lies in the range from about 700° C. to 750° C. After heating up the cold strip in the hood-type annealing furnace and maintaining the temperature over a predetermined time period, the cold strip is subsequently cooled down again, for which purpose the protective gas that is circulated through the interior space of the hood-type annealing furnace and flows around the cold strip is cooled in a first heat exchanger during a cooling phase referred to for historical reasons as the slow cooling phase over a time period of for example 7 to 15 hours. During this slow cooling phase, the temperature of the protective gas is gradually reduced in accordance with a predetermined temperature profile down to an intermediate temperature in the range of in particular 400° C.

In a following second phase, which for historical reasons is referred to as the fast cooling phase, the temperature of the protective gas is then gradually reduced from the intermediate temperature down to a final temperature, which is usually less than 80° C.

The invention is distinguished by the fact that the first heat exchanger is flowed through by the protective gas exclusively in the first, slow cooling phase and the thermal energy of the protective gas is thereby transferred by way of a closed oil circuit and a second heat exchanger to a working medium. The working medium has—with respect to standard pressure—a boiling temperature of less than 80° C., in particular less than 70° C., and evaporates in the second heat exchanger. The steam is subsequently fed to a steam motor, which converts part of the thermal energy contained in the working medium into electrical and/or mechanical energy, by for example driving an electrical generator or performing other mechanical work. Steam motors are known from the prior art and are generally also referred to as expansion engines. They operate on the principle of a steam engine with one or more cylinders, an organic substance, such as for example ethanol, which has a lower boiling point under standard pressure than water, generally being used as the working medium instead of steam.

The invention is also distinguished by the fact that a further heat exchanger, which is flowed through by the protective gas exclusively in the second, fast cooling phase, is provided. In this further heat exchanger, the thermal energy contained in the protective gas is transferred to a heat transfer medium, which is preferably water, exclusively during the fast cooling phase for heating up service water or heating water.

The invention has the advantage that the energy contained in the protective gas after the heating up of the cold strip can to a great extent be used again in the form of mechanical or electrical work and also for the heating up of water, for example for heating purposes. The combination of a conversion of the thermal energy from the hot protective gas, which is initially over 700° C., by way of the oil used according to the invention, the temperature of which is preferably kept substantially constant in the range of 260° C., and the cooling of the oil by the working medium, which already evaporates at less than 80° C., allows the operating point of the heat exchangers used to be optimized here. In the same way, the use of a steam motor, which allows considerably more sensitive control of the thermal energy extracted from the working medium in comparison with a steam turbine, makes practical control of the temperature of the protective gas within the first, slow cooling phase possible in the first place.

To put it another way, increasing or reducing the electrical and/or mechanical load on the steam motor allows the amount of heat that is taken up by the motor per unit of time to be changed comparatively quickly, whereby the temperature of the working medium can be increased or reduced to the predetermined setpoint value, of for example 260° C., likewise within a comparatively short time period, for example 30 seconds. This comparatively quick control of the temperature of the working medium to a predetermined setpoint value in turn allows the temperature of the hot protective gas, initially over 700° C., to be set to a desired setpoint value by way of changing the flow rate, whereby it is ensured that the temperature of the cold strip exposed to the protective gas within the annealing furnace is reduced during the slow cooling phase in accordance with the predetermined temperature profile.

In the case of the preferred embodiment of the invention, the oil circuit contains thermal oil, in particular mineral oil based, which, as is known, is used for the cooling and heating of industrial plants and processes in closed circuits, and which in the present case is liquid and substantially resistant under standard pressure up to a temperature of about 320° C. The thermal oil is in this case heated up in the first heat exchanger by the protective gas to a temperature in the range of preferably 265° C. and is cooled down in the second heat exchanger by the working medium to a temperature in the range of preferably 180° C., whereby effective heat transfer by way of the thermal oil and reliable control of the temperature of the protective gas by way of the flow rate of thermal oil are ensured both at the beginning of the slow cooling phase, at a temperature of the protective gas in the range of 700° C., and toward the end of the slow cooling phase, when the temperature of the protective gas is only a little more than 400° C., without the oil being chemically broken down or even evaporated. It can be seen as a further advantage of oil as a heat transfer medium that it is available at comparatively low cost even in large amounts and, by contrast with water, requires only low operating pressures in the range of a few bar in the oil circuit.

According to a further concept on which the invention is based, the working medium is an organic fluid, in particular ethanol, which is evaporated in the second heat exchanger. The organic fluid is in this case fed to the steam motor as ethanol vapor at a positive pressure in the range of 10 to 50 bar, preferably about 35 bar, and a temperature of about 250° C., acting in the steam motor on a piston, expanding as it performs mechanical work and subsequently leaving the steam motor at a lower pressure into a condenser. In the condenser, further cooling of the vapor takes place, causing it to condense, the collected amount of liquid working medium being in turn transported by way of a downstream pump to the second heat exchanger, in which the liquefied working medium is once again heated up and evaporated. The condensation of the working medium vapor in the condenser provides the advantage that the heat of condensation of the working medium can also be used at the same time, whereby the temperature range that is available for taking up the thermal energy in the second heat exchanger is once again increased in an advantageous way, and accordingly the controllability of the temperature of the oil by way of the flow rate is improved.

In the case of the preferred embodiment of the invention, the cooling of the condenser takes place by a third heat transfer medium, which is in particular water, which feeds the residual heat extracted from the working medium in the condenser to a hot-water storage unit or heating device, which may possibly in turn contain a heat exchanger, for heating up/preheating service water or else for heating purposes. This provides the advantage that the thermal energy in the protective gas that is introduced into the cold strip at the beginning of the hood-type annealing process by way of the burners can be recovered virtually completely, about 74% of the original energy being converted into electrical or mechanical energy and into directly usable thermal energy in spite of the low pressures in the oil circuit.

According to a further concept on which the invention is based, when viewed in the direction of flow of the working medium, the second heat exchanger contains a preheater for preheating the working medium, an evaporator downstream thereof for evaporating the working medium and preferably also a superheater downstream of the evaporator for superheating the vaporous working medium. In this case, to increase the efficiency in the heat recovery, first the superheater, then the evaporator and after that the preheater are flowed through one after the other by the oil of the oil circuit that is heated up in the first heat exchanger.

In the case of the preferred embodiment of the invention, it is also provided that, during the first, slow cooling phase, the protective gas is circulated with a substantially constant volumetric flow in a closed circuit through the hood-type annealing furnace and the first heat exchanger, and that the temperature of the protective gas within the hood-type annealing furnace is changed—as already previously stated—on the basis of the flow rate of oil through the first heat exchanger. This provides a possibility for particularly quick and precise control of the temperature of the protective gas within the hood-type annealing furnace.

In order to recover the thermal energy contained in the heated-up cold-strip coils with particularly high efficiency, it is also provided that the steam motor is coupled in driving terms to an electrical generator, which feeds the generated electrical energy into a power storage unit and/or into the public power supply and/or into a power supply of its own.

In this case, at least part of the electrical energy generated by the generator is preferably fed to an electrically driven blower, assigned to the first heat exchanger, for the circulation of the protective gas through the interior space of the hood-type annealing furnace and/or to an electrically operated pumping device for the circulation of the oil within the closed oil circuit through the first and second heat exchangers and/or to an electrically operated pump for transporting the working medium, so that no additional electrical energy is required to operate it.

Other features which are considered as characteristic for the invention are set forth in the appended claims.

Although the invention is illustrated and described herein as embodied in a method and a configuration for the recovery of thermal energy in the heat treatment of cold-rolled steel strip in a hood-type annealing furnace, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
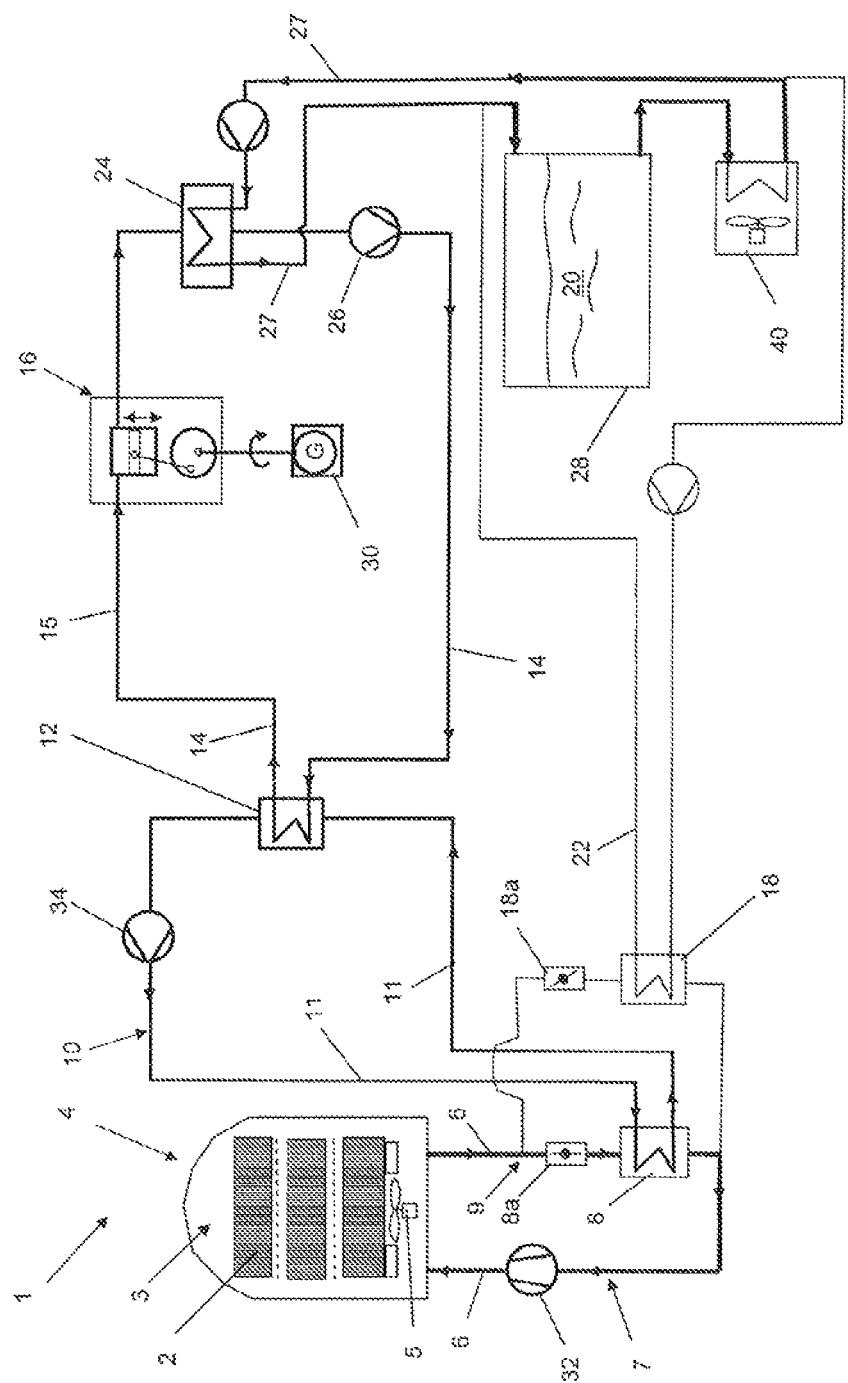
FIG. 1 is an illustration showing a configuration according to the invention during a slow cooling phase.
Figure 2:
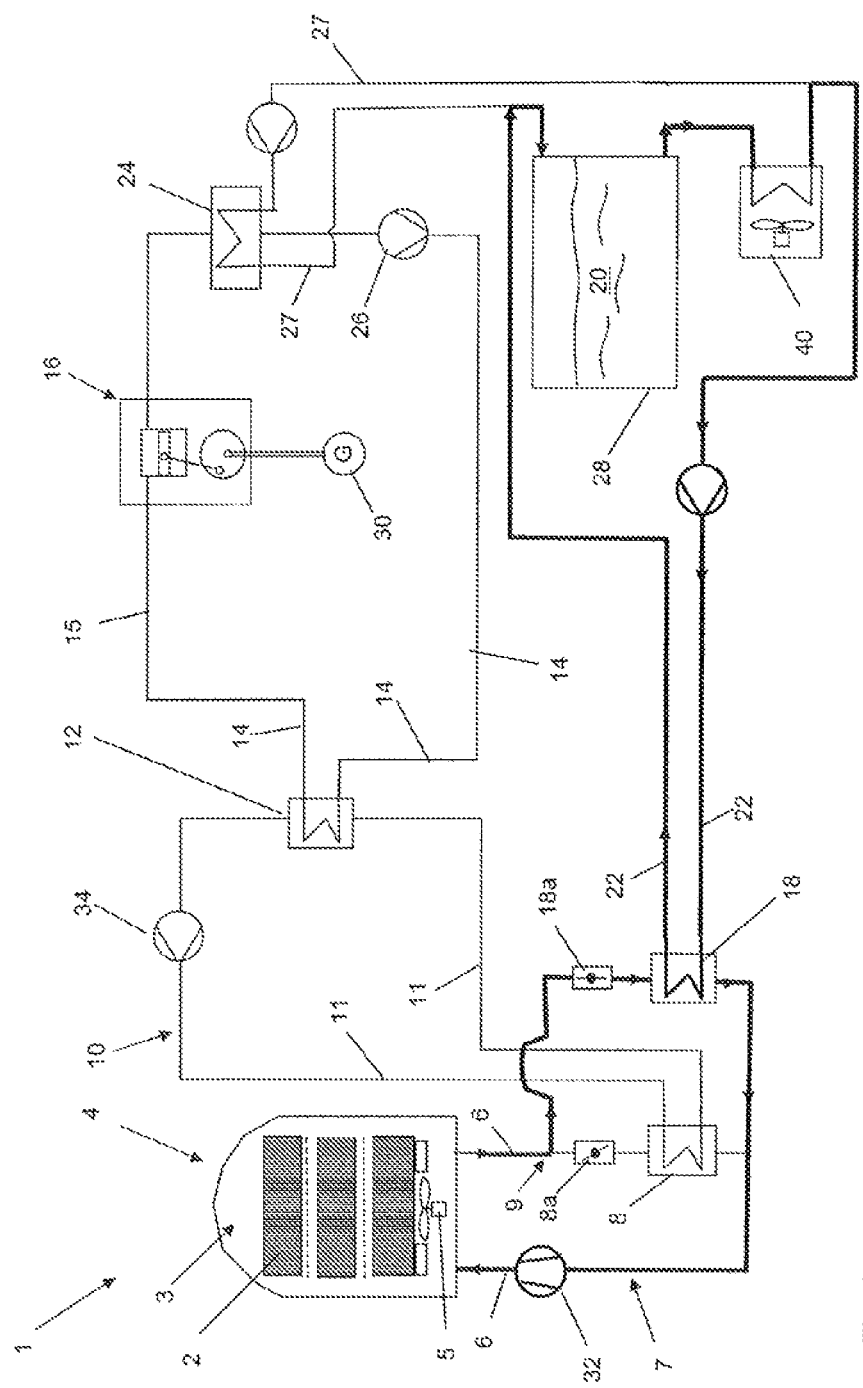
FIG. 2 is an illustration showing the configuration according to the invention during a fast cooling phase.
Figure 3:
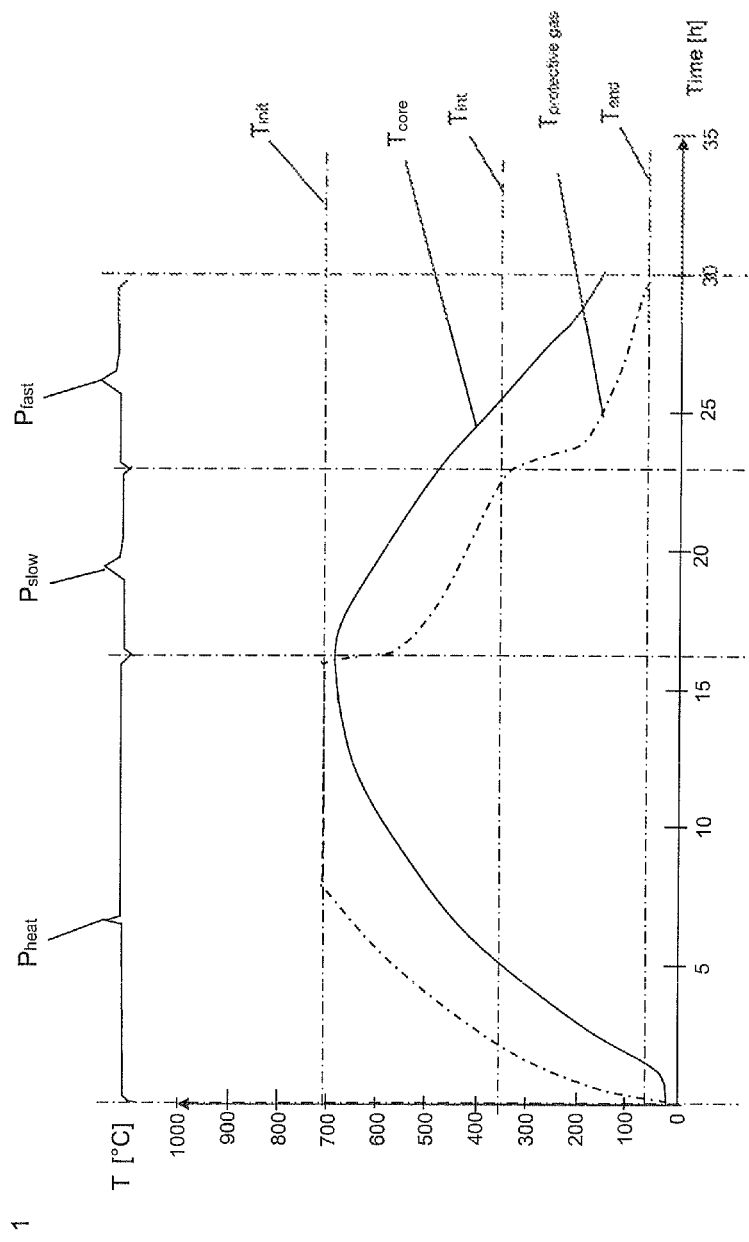
FIG. 3 is a graph showing a profile, given by way of example, of temperatures of a protective gas and of a core of a cold-strip coil during a heating-up phase, the slow cooling phase and the subsequent fast cooling phase in dependence on time.

Referring now to the figures of the drawing in detail and first, particularly, to FIGS. 1 and 2 thereof, there is shown a configuration 1 for the recovery of thermal energy in a thermal treatment of a cold-rolled steel strip 2 which contains a hood-type annealing furnace 4. The annealing furnace 4 has a number of coils of cold strip arranged one above the other and arranged in a known way under an annealing hood that is closed off in an airtight manner with respect to the outside, in order to heat up the coils after the cold-rolling process to a temperature above the recrystallization temperature. Within the hood-type annealing furnace 4, the annealing hood of which is not included in the representation of the drawings for the sake of overall clarity, there is an atmosphere of a protective gas 6, which is preferably hydrogen gas, which is circulated through between the coils by way of a blower 5 that is indicated in the figures. During the heating-up phase, which is referred to in FIG. 3 as Pheat and is depicted in the representation of FIG. 3 only by way of example, for this purpose the protective gas 6 is heated up indirectly by way of burners that are not shown any more specifically and is circulated for as long as it takes until the desired temperature, for example 710° C., has been reached. Following this, the temperature of the protective gas 6 is reduced according to a temperature profile depicted in FIG. 3 in two successive cooling phases, of which the first cooling phase is referred to as the slow cooling phase Pslow and the second cooling phase is referred to as the fast cooling phase Pfast.

In order to lower the temperature of the cold strip in the course of the cooling phases Pslow and Pfast in accordance with the desired temperature profiles, the protective gas 6 is circulated in a closed protective gas circuit 7 by way of an electrically operated blower 32, the temperature of the protective gas 6 corresponding substantially to the average control temperature that the cold strip 2 is intended to assume. On account of the comparatively great thermal capacity of the cold-strip coils, the core temperature of the coils denoted in the diagram of FIG. 3 by Tcore and represented as a solid line decreases in this case considerably more slowly than the temperature of the hydrogen gas denoted by Tprotective gas and depicted as a dash-dotted line.

According to the representation of FIG. 1, the protective gas 6, which toward the end of the heating-up phase Pheat has an initial maximum temperature Tinit of for example 710° C., during the first, slow cooling phase Pslow is circulated exclusively by way of a first heat exchanger 8, the cold side of which is in flow connection with a second heat exchanger 12 by way of a closed oil circuit 10 and an electrically actuated pump 34. The oil circuit 10 in this case contains liquid thermal oil, which is heated up in the first heat exchanger 8 by the protective gas 6 to a temperature in the range of 265° C. and is cooled down in the second heat exchanger 12 by a working medium 14 to a temperature in the range of 180° C.

The working medium 14 is an organic fluid, in particular ethanol, which has under standard pressure a boiling temperature of less than 80° C., in particular less than 70° C., and is evaporated in the second heat exchanger 12. The evaporated working medium 14 is subsequently fed by way of a feed line 15 under pressure, preferably in the range of 35 bar, to a known steam motor, which operates in a way similar to a piston steam engine, or a modified reciprocating piston engine or air motor, and converts part of the thermal energy contained in the vaporous working medium 14 into mechanical work, which is preferably used by way of a shaft indicated schematically in FIG. 1 for driving an electrical generator 30. Arranged downstream in the direction of flow of the working medium 14 of the steam motor 16, on the outlet side, is a condenser 24, which is cooled by way of a heat transfer medium, preferably cooling water 27, to a temperature below the boiling point, in order to convert the vaporous working medium 14 into the liquid state. Downstream of the condenser 24, the liquefied working medium 14 is fed by way of an electric pump 26 once again to the second heat exchanger 12, in order once again to evaporate the working medium 14.

Figure 4:
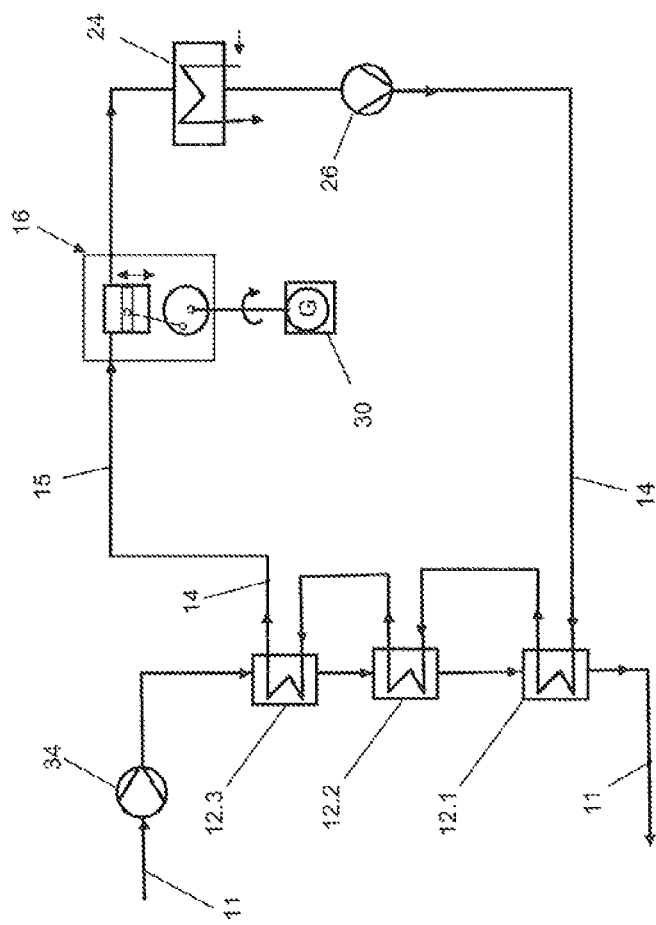
FIG. 4 is an illustration showing a superheater, an evaporator and a preheater used in the case of the particularly preferred embodiment of the invention that are flowed through one after the other by oil.

In order in this case to increase further the efficiency of the energy recovery, it is provided in the case of the preferred embodiment of the invention according to the representation of FIG. 4 that, when viewed in the direction of flow of the working medium 14, the second heat exchanger 12 contains a preheater 12.1 for preheating the working medium 14, an evaporator 12.2, arranged downstream thereof in terms of flow, for evaporating the working medium 14 and also a superheater 12.3, arranged downstream in terms of flow of the evaporator 12.2, which superheats the working medium vapor generated in the evaporator, for example to a temperature of preferably about 250° C., before the vapor is fed to the steam motor 16. In this case, first the superheater 12.3, then the evaporator 12.2 and finally the preheater 12.1 are flowed through one after the other by the oil 11, which, when it enters the superheater 12.3, has for example a temperature in the range of 265° C., and gives off there part of its thermal energy to the vaporous working medium 14 before it enters the hot side of the evaporator 12.2, which is likewise in principle a known heat exchanger. Once the oil 11 has given off a further part of its thermal energy to the working medium 14 in the evaporator 12.2, in order to evaporate it, the warm oil 11, which has been cooled down further as a result and is preferably less than 70° C., is passed through the hot side of the preheater 12.1, which is likewise a heat exchanger, in which part of the amount of residual heat remaining in the oil 11 is transferred to the liquid working medium 14, in order to heat it up to a temperature just below the boiling temperature of for example 70° C.

As can be further seen from FIG. 1, in which the media circuits that are active during the first, slow cooling phase are emphasized by lines printed in bold, the heat transfer medium 27 is for example fed by way of a further heat exchanger that is not shown any more specifically in the drawings in a circuit given by way of example to a hot-water storage unit 28, in order to heat up directly the water 20 collected therein. Alternatively, the heat transfer medium 27 may, however, also be cold water fed from the supply system, which flows through the condenser 24 in order to enter the hot-water storage unit 28 in a preheated state, from which it subsequently can be taken for heating purposes or as service water.

As also indicated in FIG. 3 by the lines printed in bold, on reaching an intermediate temperature Tint, of for example 400° C., at the end of the first, slow cooling phase Pslow (compare FIG. 3), the temperature of the protective gas 6 is reduced further in the subsequent fast cooling phase Pfast down to the final temperature Tend, which preferably lies below 80° C. For this purpose, the feed line of the hot protective gas 6, at about 400° C., to the first heat exchanger 8 is interrupted by closing the valve 8a arranged upstream of the heat exchanger 8, and the valve 18a arranged upstream of a further heat exchanger 18 is opened, whereupon the protective gas 6 is circulated back by way of a protective gas line branching off upstream of the valve 8a at a node point 9 through a further heat exchanger 18 and from the latter back into the interior space 3 of the hood-type annealing furnace 4. In the further heat exchanger 18, which is flowed through by the protective gas 6 exclusively in the second, fast cooling phase, the thermal energy contained in the protective gas 6 is fed by way of a further heat transfer medium 22, preferably water, to a hot-water storage unit, which is preferably the already previously mentioned hot-water storage unit 28, in which the water for cooling the condenser 24 is preheated. In addition, an additional cooler 40 that is indicated in FIGS. 1 and 2, in particular in the form of a free air cooler, may be integrated in the feed line for the heat transfer medium 27 to the condenser 24, and cools the heat transfer medium fed to the condenser when the temperature of the hot water 20 in the service-water storage unit 28 becomes too high. According to an embodiment that is not shown any more specifically, the additional cooler 40 may additionally also be connected in terms of flow by way of a suitable valve and a feed line to the feed line to the service-water storage unit 28 and/or the feed line to the further heat exchanger 18, in order also to prevent superheating of the hot water 20 in the service-water storage unit 28 during the fast cooling phase Pfast that is shown in FIG. 2, if for example in summer the demand for hot service water and/or heating water is low. Similarly, cooling of the hot water 20 by way of a heat exchanger not shown, in the form of a coil in the service-water storage unit 28, is similarly conceivable.

It goes without saying that, instead of the water 20 in the service-water storage unit 28, for example a heating medium, such as for example air, may also be heated up by the further heat transfer medium 22, by way of a further heat exchanger, in order still to be able to use the residual energy in the protective gas 6 effectively for heating purposes even at the end of the fast cooling phase Pfast, when the protective gas 6 only has a temperature in the range of the final temperature Tend.

Use of the arrangement 1 according to the invention makes it possible to use the thermal energy contained in the protective gas 6 very effectively in spite of the comparatively great ranges in temperature during the slow and fast cooling phases.

The control of the flow rates of oil, working medium 14 and water in the respective circuits takes place in this case by way of an electronic control device and corresponding sensors that are not shown any more specifically in the drawings.

LIST OF DESIGNATIONS 1 arrangement according to the invention
2 cold strip
3 interior space of the hood-type annealing furnace
4 hood-type annealing furnace
5 blower
6 protective gas
7 closed protective gas circuit
8 first heat exchanger
8a valve
9 node point
10 closed oil circuit
11 oil
12 second heat exchanger
12.1 preheater
12.2 evaporator
12.3 superheater
14 working medium/ethanol
15 feed line
16 steam motor
18 further heat exchanger
18a valve
20 hot water
22 further heat transfer medium
24 condenser
26 pump for condensed working medium
27 third heat transfer medium 28 service-water storage unit
30 electrical generator
32 electrical blower
34 electrically operated pump for oil
40 additional cooler
Pslow slow cooling phase
Pfast fast cooling phase
Tinit initial temperature of the protective gas
Tint intermediate temperature
Tend final temperature

The invention claimed is:

1. A method for recovering thermal energy in a thermal treatment of a cold-rolled steel strip in a hood-type annealing furnace, where the cold-rolled steel strip is heated up in a protective gas atmosphere to a temperature above a recrystallization temperature, being subjected in a subsequent first, slow cooling phase and a second, fast cooling phase, following the first, slow cooling phase, to a protective gas and having a temperature reduced in a course of the first, slow cooling phase down to an intermediate temperature and in the second, fast cooling phase from the intermediate temperature to a final temperature, which comprises the steps of:
 providing a first heat exchanger being flowed through by the protective gas exclusively in the first, slow cooling phase, the first heat exchanger transferring the thermal energy of the protective gas by way of a closed oil circuit and a second heat exchanger to a working medium, the working medium under standard pressure having a boiling temperature of less than 80° C., and evaporates in the second heat exchanger;
 feeding the working medium to a steam motor, the steam motor converting a part of the thermal energy contained in the working medium into at least one of mechanical or electrical energy;
 coupling the steam motor in driving terms to an electrical generator, the electrical generator feeding generated electrical energy into at least one of a power storage unit, a public power supply or a power supply of its own; and
 providing a further heat exchanger being flowed through by the protective gas exclusively in the second, fast cooling phase and in the further heat exchanger the thermal energy contained in the protective gas is transferred to a further heat transfer medium for heating up service water.

2. The method according to claim 1, which further comprises:
 heating up thermal oil contained in the closed oil circuit via the first heat exchanger by the protective gas to a temperature of 265° C.; and
 cooling down the thermal oil in the second heat exchanger by the working medium to a temperature of 180° C.

3. The method according to claim 1, wherein the working medium is an organic fluid, which is evaporated in the second heat exchanger, and in that the steam motor is followed downstream by a condenser and a pump, by way of which the working medium is condensed after leaving the steam motor and is transported once again to the second heat exchanger.

4. The method according to claim 3, which further comprises cooling the condenser via a heat transfer medium, which feeds residual heat extracted from the working medium to at least one of a hot-water storage unit or a heating device for heating up the service water or for heating purposes.

5. The method according to claim 1, wherein when viewed in a direction of flow of the working medium, the second heat exchanger contains a preheater for preheating the working medium, an evaporator disposed downstream of the preheater for evaporating the working medium and also a superheater disposed downstream of the evaporator for superheating the vaporous working medium, first the superheater, then the evaporator and after that the preheater being flowed through one after the other by oil of the closed oil circuit that is heated up in the first heat exchanger.

6. The method according to claim 1, which further comprises:
 during the first, slow cooling phase, circulating the protective gas with a substantially constant volumetric flow in a closed circuit through the hood-type annealing furnace and the first heat exchanger; and
 changing a temperature of the protective gas within the hood-type annealing furnace on a basis of a flow rate of oil through the first heat exchanger.

7. The method according to claim 1, wherein the electrical generator feeds part of the electrical energy generated by the electrical generator to an electrically driven blower, assigned to the first heat exchanger, for circulation of the protective gas through an interior space of the hood-type annealing furnace and to an electrically operated pumping device for the circulation of oil through the first and second heat exchangers and to an electrically operated pump for transporting the working medium.

8. The method according to claim 1, which further comprises:
 setting the intermediate temperature to 400° C.;
 setting the final temperature to less than 80° C.;
 setting the boiling temperature to less than 70° C.; and
 providing water as the further heat transfer medium.

9. The method according to claim 3, which further comprises providing ethanol as the working medium.

10. The method according to claim 4, which further comprises providing water as the heat transfer medium.

* * * * *